(12) United States Patent
Wagner

(10) Patent No.: US 10,309,534 B2
(45) Date of Patent: Jun. 4, 2019

(54) CONTROL DEVICE IN A MOTOR VEHICLE HAVING AN ELECTRONICALLY CONTROLLABLE AUTOMATIC TRANSMISSION IN THE APPLICATION CASE OF A CAR WASH

(71) Applicant: Bayerische Motoren Werke Aktiengesellschaft, Munich (DE)

(72) Inventor: Christopher Wagner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 35 days.

(21) Appl. No.: 15/786,655

(22) Filed: Oct. 18, 2017

(65) Prior Publication Data

US 2018/0038481 A1 Feb. 8, 2018

Related U.S. Application Data

(63) Continuation of application No. PCT/EP2016/058598, filed on Apr. 19, 2016.

(30) Foreign Application Priority Data

May 12, 2015 (DE) .......................... 10 2015 208 753

(51) Int. Cl.
*F16H 63/50* (2006.01)
*F16H 59/02* (2006.01)
(Continued)

(52) U.S. Cl.
CPC ................ *F16H 63/50* (2013.01); *B60S 3/00* (2013.01); *B60W 10/04* (2013.01); *B60W 10/06* (2013.01);
(Continued)

(58) Field of Classification Search
None
See application file for complete search history.

(56) References Cited

U.S. PATENT DOCUMENTS 8,062,177 B2 * 11/2011 Hecht .................. F16H 63/483
477/125
8,235,866 B2 * 8/2012 Steinhauser .......... F16H 63/483
477/96
(Continued)

FOREIGN PATENT DOCUMENTS

CN 103161936 A 6/2013
CN 103587504 A 2/2014
(Continued)

OTHER PUBLICATIONS

German-language Search Report issued in counterpart German Application No. 10 2015 208 753.0 dated Feb. 29, 2016 with partial English-language translation (Eleven (11) pages).
(Continued)

*Primary Examiner* — Dirk Wright
(74) *Attorney, Agent, or Firm* — Crowell & Moring LLP

(57) ABSTRACT

A control device is provided for a motor vehicle having an electronically controllable automatic transmission, an electronic transmission selector lever and an electronic control unit. The control unit, which may be the transmission control unit, has a car wash functional module such that, after activation of the car wash functional module, the following steps are permitted at least once and/or at least for a predefined limited time, in each case without activation of the brake pedal: shutting down of the engine in the transmission selector lever position "N"; a subsequent restart of the engine in the transmission selector lever position "N"; and a changeover from the transmission selector lever position "N" to "D". The car wash functional module can be
(Continued)

activated or deactivated by the driver at his discretion via a display operator control element.

8 Claims, 2 Drawing Sheets

(51) Int. Cl.
  *F16H 63/40* (2006.01)
  *B60S 3/00* (2006.01)
  *B60W 10/06* (2006.01)
  *B60W 10/10* (2012.01)
  *F02N 11/08* (2006.01)
  *B60W 10/04* (2006.01)

(52) U.S. Cl.
  CPC ......... *B60W 10/10* (2013.01); *F02N 11/0822* (2013.01); *F02N 11/0833* (2013.01); *F16H 59/0204* (2013.01); *F16H 63/40* (2013.01); *F02N 2200/0802* (2013.01); *F02N 2200/102* (2013.01); *F02N 2200/12* (2013.01); *F16H 2312/20* (2013.01); *Y02T 10/48* (2013.01)

(56) References Cited

U.S. PATENT DOCUMENTS

| | | | | |
|---|---|---|---|---|
| 8,583,330 B2* | 11/2013 | Furness | ..................... | B60S 3/00 |
| | | | | 701/36 |
| 8,634,995 B2* | 1/2014 | Deurloo | .................. | F16H 61/16 |
| | | | | 192/219.4 |
| 9,132,807 B2* | 9/2015 | Stadler | ..................... | B60S 3/00 |
| 9,477,225 B2* | 10/2016 | Stadler | ..................... | B60S 3/04 |
| 2002/0140387 A1* | 10/2002 | Gorsick | ............... | B60S 1/0818 |
| | | | | 318/445 |
| 2005/0266958 A1 | 12/2005 | Ehrmaier | | |
| 2011/0087386 A1 | 4/2011 | Steinhauser et al. | | |
| 2013/0151095 A1 | 6/2013 | Fyie et al. | | |
| 2013/0151097 A1 | 6/2013 | Deurloo et al. | | |
| 2014/0052312 A1 | 2/2014 | Stadler | | |
| 2014/0136060 A1 | 5/2014 | Deurloo et al. | | |

FOREIGN PATENT DOCUMENTS

DE         102 53 936 A1    6/2004
DE   10 2012 021 596 A1    5/2014

OTHER PUBLICATIONS

International Search Report (PCT/ISA/210) issued in PCT Application No. PCT/EP2016/058598 dated Jun. 27, 2016 with English-language translation (Five (5) pages).

German-language Written Opinion (PCT/ISA/237) issued in PCT Application No. PCT/EP2016/058598 dated Jun. 27, 2016 (Six (6) pages).

Chinese-language Office Action issued in counterpart Chinese Application No. 201680021611.1 dated Sep. 3, 2018 with English translation (12 pages).

* cited by examiner

CONTROL DEVICE IN A MOTOR VEHICLE HAVING AN ELECTRONICALLY CONTROLLABLE AUTOMATIC TRANSMISSION IN THE APPLICATION CASE OF A CAR WASH

CROSS REFERENCE TO RELATED APPLICATIONS

This application is a continuation of PCT International Application No. PCT/EP2016/058598, filed Apr. 19, 2016, which claims priority under 35 U.S.C. § 119 from German Patent Application No. 10 2015 208 753.0, filed May 12, 2015, the entire disclosures of which are herein expressly incorporated by reference.

BACKGROUND AND SUMMARY OF THE INVENTION

The invention relates to a control device in a motor vehicle having an electronically controllable automatic transmission depending on the position of an electronic transmission selector lever.

A control device of such a type, in particular in the form of a safety device, is known from DE 102 53 936 A1, for example.

For electronically controlled automatic transmissions a large number of safety measures need to be provided to counter unintentional rolling-away of the vehicle. A safety measure of such a type is described, for example, in the "Key Interlock" specification (according to FMVSS 114) which has long been known. This specification states, inter alia, that in vehicles having an automatic transmission, the ignition key may only be withdrawn when the selector lever of the automatic transmission is located in the "P" position for parking. By this means, the situation is intended to be prevented where the driver exits the motor vehicle without having previously secured the motor vehicle against unintentional rolling-away. In order to satisfy this specification, the ignition lock may exhibit suitable mechanical locking mechanisms which can be actuated via the ignition key.

Increasingly, however, motor-vehicle access systems and startup systems without a mechanical ignition lock are finding application. Such keyless startup systems without a mechanical ignition lock include an identification transmitter (ID transmitter—a key with integrated transponder) to be carried by the user of the vehicle, as well as a device for starting and stopping the engine, which can be actuated manually by means of a push-button or even automatically by means of an appropriate electronic drive-control unit (MSA, automatic engine start/stop). As soon as the ID transmitter is detected in the passenger compartment of the vehicle, the authentication of the ID transmitter is carried out via an interrogation-and-response dialog of the ID transmitter with a transceiver device of the motor vehicle, and in the case of positive authentication the engine is started after actuation of the device.

The latest developments are proceeding in the direction that for the purpose of starting the engine the ID transmitter no longer even has to be inserted into the socket, but rather the electronics located within the motor vehicle, regardless of whether the ID transmitter is located in the socket, establish the presence of the ID transmitter within the vehicle and carries out the requisite authentication. The corresponding new developments are known under the designations "Comfort Access" and "Keyless Go".

In connection with these new systems, from DE 102 53 936 A1, for example, a solution is demonstrated as to how the key-interlock specification can be satisfied in the use case of keyless startup systems in which the ID transmitters are located at an arbitrary position in the motor vehicle without a predetermined physical connection to other parts of the motor vehicle. In this case, there is provision to be able to shut down the engine also while the vehicle is in motion, provided that the speed of the motor vehicle is greater than a certain threshold speed. Below the threshold speed, the vehicle firstly has to be brought to a standstill, and the parking position "P" has to be engaged before the engine can be shut down.

In more recent vehicles, however, in particular having an electronic transmission selector lever, a shutdown of the engine can also be made possible irrespective of the chosen transmission position and irrespective of the speed of the vehicle if certain other defined conditions have been fulfilled; in particular if certain engine-shutdown conditions within the scope of an automatic engine start/stop device (MSA) are present.

In DE 102 53 936 A1 it is already proposed that a motor vehicle having an automatic transmission is to be moved while in transmission position "N" (for "neutral") with the engine switched off. Two possibilities for this arise as described below.

In a first alternative, the ID transmitter has not been inserted into a vehicle-side socket and is accordingly located, for example, in a pocket of the driver. The driver engages transmission position "P" for parking, switches the engine and the ignition off, switches the ignition on again, and engages (where appropriate with simultaneous actuation of the brake) transmission position "N" for neutral. The motor vehicle can now, for example, be pushed by hand or pass through a car wash. For the purpose of driving away out of the car wash, however, the footbrake has to be applied for a restart of the engine, in order to be able to switch from position "N" to position "D" for Drive.

In a second alternative, the ID transmitter is inserted into the motor-vehicle-side socket provided for it and is locked therein, as known from the prior art. As a consequence of this, the engine and the ignition can be switched off at any time and in any selector-lever or transmission position. In the normal case, the engine is accordingly shut down in position "D" for "Drive", and subsequently position "N" is engaged. Here too, the motor vehicle can now, for example, be moved manually or pass through a car wash.

It is an object of the invention to simplify the handling of a motor vehicle having an automatic transmission, in particular with regard to exiting a car wash.

This and other objects are achieved by the control device according to the invention for a motor vehicle. The control device has an electronically controllable automatic transmission, an electronic transmission selector lever and an electronic control unit. The control unit, which is preferably the transmission control unit, has a car-wash functional module such that, after activation of the car-wash functional module, at least once and/or at least for a predetermined limited time, the following actions are permitted, in each instance without actuation of the brake pedal:

a shutdown of the engine in transmission-selector-lever position "N", a subsequent restart of the engine in transmission-selector-lever position "N" and also a change from transmission-selector-lever position "N" to "D".

The car-wash functional module can preferably be activated or deactivated arbitrarily by the driver via an operating element of the display. In this case, for example, a menu item may be provided for selection of a permanent activation, and/or a menu item may be provided for selection of only a single activation, and/or a menu item may be provided for selection of a temporally limited activation of the car-wash function.

Alternatively or additionally, the car-wash functional module can be activated automatically by a change from automatic gear selection "D" to position "N," and by subsequent manual shutdown of the engine.

Still further defined signal sequences for activating the car-wash function may also be provided.

In an advantageous further development of the invention, a monitoring device monitors for the presence of the driver. The transmission parking lock assigned to transmission-selector-lever position "P" is engaged automatically if no presence of the driver is detected.

The invention relates, in particular, to vehicles having automatic transmissions which travel through a car wash with a pull-cable, in which the vehicle is pulled along in a rolling manner. But the car-wash function may, of course, also be employed for other, similar situations.

According to the prior art, the driver ordinarily has to actuate the brake twice at the end of the car wash, in order to be able to drive the vehicle out of the car wash. The first actuation of the brake is required in order to start the internal combustion engine. The second actuation of the brake is required shortly after this, in order to change from automatic gear selection "N" to automatic gear selection "D".

In the case of vehicles following one another in close succession in the car wash, there is a risk of tailgating situations or collisions with one's own vehicle occurring by reason of an excessively long actuation of the brake.

If the footbrake is not applied sufficiently strongly or for a sufficiently long time during the restart of the engine, automatic gear selection "P" is engaged, whereupon the transmission lock becomes active and the pull-cable roller of the car wash may extend underneath the stationary vehicle, unless an emergency-stop function has been implemented in the installation.

Irrespective of both risks, this drive-out process represents a fundamental stress situation for the driver.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
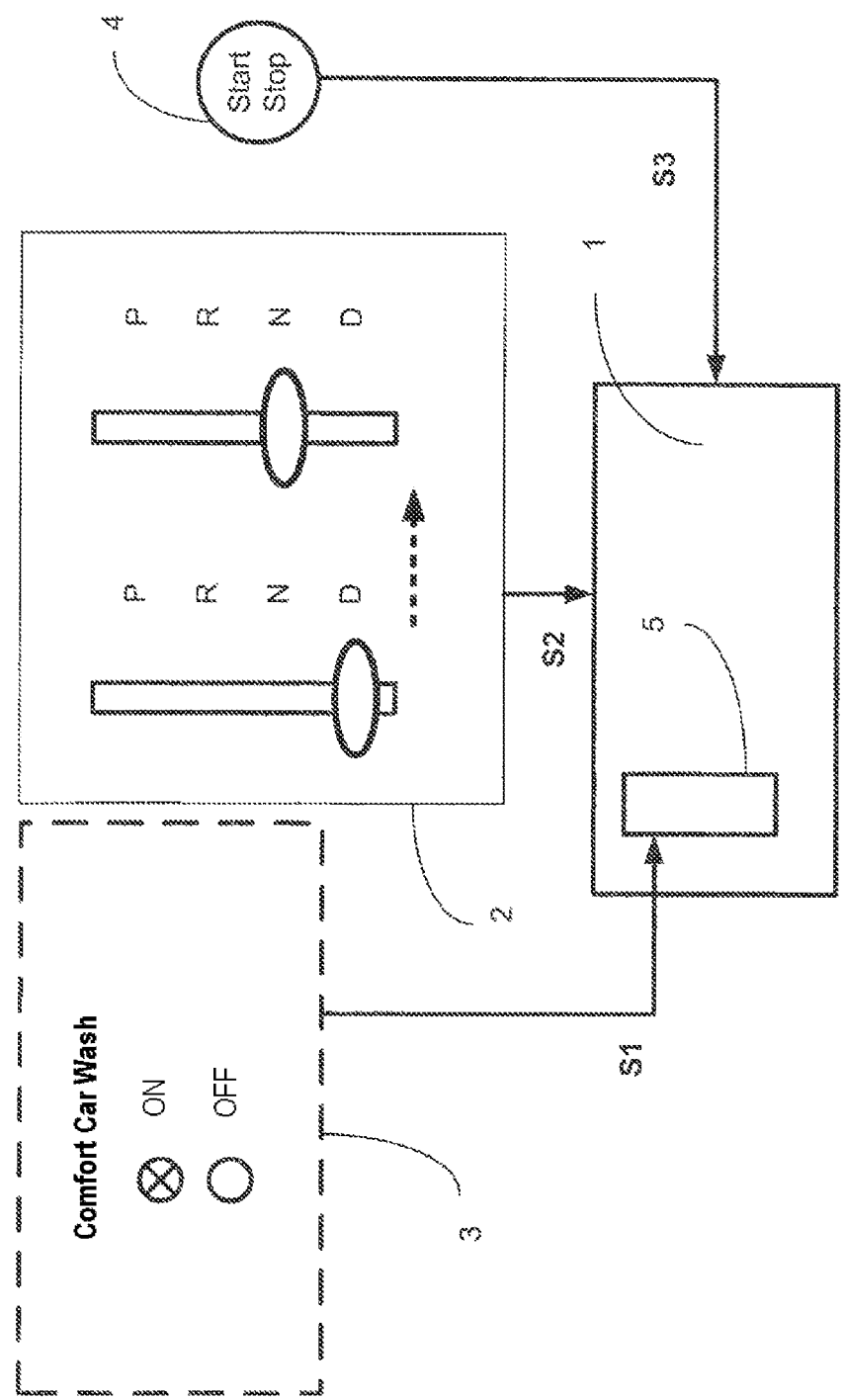
FIG. 1 is a schematic diagram illustrating operation of a car-wash functional module according to an embodiment of the invention when driving into a car wash.
Figure 2:
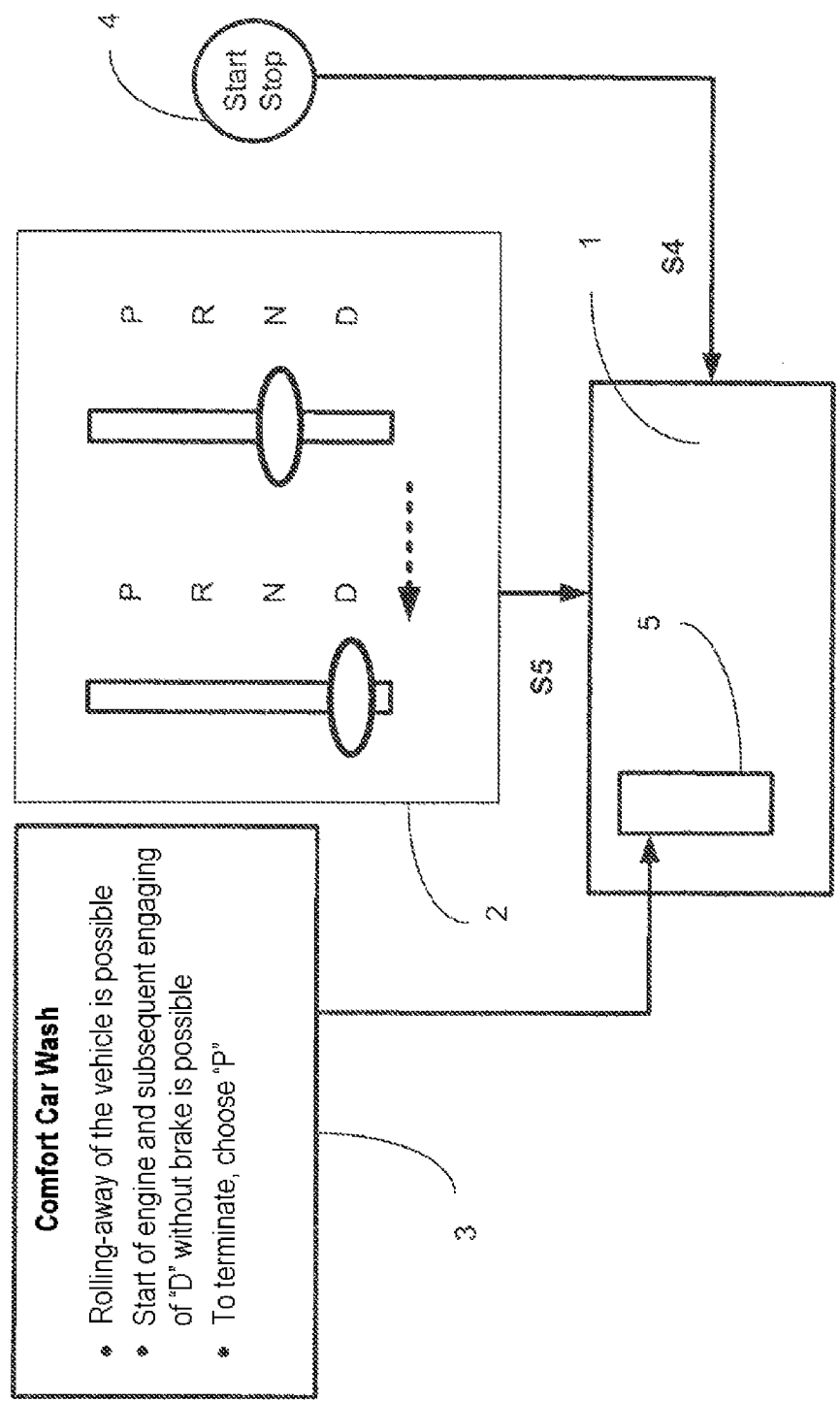
FIG. 2 is a schematic diagram illustrating operation of the car-wash functional module when driving out of a car wash.

FIG. 1 and FIG. 2 both show schematically an electronic transmission control unit 1, a transmission selector lever 2, a display operating element 3 (for example, iDrive from BMW), and an engine start/stop push-button 4 for switching on and off an internal combustion engine (not represented here in any detail). The transmission control unit 1 contains a car-wash functional module 5, for example in the form of a software program. Moreover, the transmission control unit 1 serves for controlling an automatic transmission (not represented here in any detail), in particular also in a manner depending on the position of the transmission selector lever 2 or of the automatic gear selection engaged in each instance by this means.

The steps for driving the vehicle into a car wash will be described with reference to FIG. 1.

The initial situation is the situation in which the driver is located in the vehicle, the ignition has been switched on, and the engine is running. The driver firstly actuates the transmission selector lever 2, in order to change from position or automatic gear selection "D" to "N" (as indicated by the dashed arrow), and then switches the engine off by way of the start/stop push-button 4. The transmission control unit 1 detects the corresponding signals S2 and S3. This signal sequence leads, for example, to the activation of the car-wash functional module 5. Additionally or alternatively, the car-wash functional module 5 can also preferably be activated by means of appropriate setting in the display operating element 3, which for this purpose outputs an output signal S1 to the transmission control unit 1.

In FIG. 2, after the car-wash function has been switched on (for example, after driving into the car wash), a display with at least one of the following items of information is represented in the display operating element 3:

Rolling-away of the vehicle is possible. (Do not exit the vehicle!)

Start of engine and subsequent engaging of "D" without brake is possible.

Vehicle cannot be locked from outside.

To terminate, choose "P".

For the purpose of driving the vehicle out of the car wash, the engine can then be restarted per signal S4, specifically without actuation of the brake pedal. Similarly, for the purpose of driving out, a change can be made from position "N" to "D" providing signal S5, without actuation of the brake pedal.

Via the display operating element 3, the car-wash function may always be switched on or may be always switched on again—that is to say, it may be capable of being switched on at least once and/or at least for a predetermined limited time.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control device in a motor vehicle equipped with an electronically controllable automatic transmission and an electronic transmission selector lever, comprising:
   an electronic control unit comprising a car-wash functional module, wherein the car-wash functional module is executed such that, after activation of the car-wash functional module, the following actions are permissible at least once and/or at least for a predetermined time period in each case without requiring actuation of a brake pedal of the motor vehicle:
      a shutdown of an engine of the motor vehicle in a position "N" of the electronic transmission selector lever;
      a subsequent restart of the engine in the position "N" of the electronic transmission selector lever, and
      a change from the position "N" to a position "D" of the electronic transmission selector lever.

2. The control device according to claim 1, further comprising:
an interface with a display operating element, wherein the car-wash functional module is activatable via the interface.

3. The control device according to claim 1, wherein the car-wash functional module is activatable automatically via a change from automatic gear selection position "D" to position "N" and a subsequent manual shutdown of the engine.

4. The control device according to claim 1, further comprising:
a monitoring device that monitors for a presence of a driver of the motor vehicle, wherein
a transmission parking lock assigned to a position "P" of the electronic transmission selector lever is engaged automatically if the presence of the driver is not detected.

5. A method of operating a car-wash function of an electronic control unit of a motor vehicle equipped with an electronically controllable automatic transmission and an electronic transmission selector lever, the method comprising the acts of:
following activation of the car-wash function of the electronic control unit, permitting the following actions at least once and/or at least for a predetermined time period without requiring actuation of a brake pedal of the motor vehicle:
a) shutting down of an engine of the motor vehicle in a neutral position of the transmission selector lever,
b) subsequently restarting the engine in the neutral position of the transmission selector lever, and
c) allowing a change from the neutral transmission selector lever position to a drive position.

6. The method according to claim 5, further comprising the act of:
activating the car-wash function via a display operating element in the motor vehicle.

7. The method according to claim 5, further comprising the act of:
activating the car-wash function automatically via a change from an automatic gear selection drive position to the neutral position and a subsequent manual shutting down of the engine.

8. The method according to claim 5, further comprising the acts of:
monitoring for a presence or absence of the driver in the vehicle; and
engaging automatically a transmission parking lock assigned to a park position of the transmission selector lever if the presence of the driver is not detected.

* * * * *